(12) United States Patent
Litwinski et al.

(10) Patent No.: US 6,843,404 B2
(45) Date of Patent: Jan. 18, 2005

(54) METHOD OF MANUFACTURING RIVETS HAVING HIGH STRENGTH AND FORMABILITY

(75) Inventors: Edward Litwinski, Mission Viejo, CA (US); Rahmatollah F. Toosky, San Clemente, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/631,906

(22) Filed: Jul. 31, 2003

(65) Prior Publication Data

US 2004/0020967 A1 Feb. 5, 2004

Related U.S. Application Data

(62) Division of application No. 10/145,342, filed on May 14, 2002.

(51) Int. Cl.[7] .............................................. B23K 20/12
(52) U.S. Cl. ................................... 228/2.1; 228/112.1
(58) Field of Search ............................... 228/112.1, 2.1

(56) References Cited

U.S. PATENT DOCUMENTS

| 5,460,317 | A | | 10/1995 | Thomas et al. |
| 5,975,406 | A | * | 11/1999 | Mahoney et al. ........ 228/112.1 |
| 6,213,379 | B1 | | 4/2001 | Takeshita et al. |
| 6,230,957 | B1 | | 5/2001 | Arbegast et al. |
| 6,230,958 | B1 | | 5/2001 | Coletta et al. |
| 6,742,697 | B2 | * | 6/2004 | McTernan et al. ........ 228/112.1 |
| 2001/0052178 | A1 | * | 12/2001 | Luhm ...................... 29/525.06 |
| 2002/0125297 | A1 | * | 9/2002 | Stol et al. ................ 228/112.1 |
| 2004/0118900 | A1 | * | 6/2004 | Stevenson et al. ........ 228/114.5 |

FOREIGN PATENT DOCUMENTS

| EP | 1 162 283 A2 | 12/2001 |
| WO | WO 97 15462 A | 5/1997 |
| WO | WO 00/27559 | 5/2000 |

OTHER PUBLICATIONS

Donald S. Clark, Ph.D. and Wilbur R. Varney, M.S., *Physical Metallurgy For Engineers*, Jan. 31, 1962, four pages, second edition, D. Van Nostrand Company, Inc., Princeton, New Jersey.

* cited by examiner

Primary Examiner—Lynne R. Edmondson
(74) Attorney, Agent, or Firm—Alston & Bird LLP

(57) ABSTRACT

A rivet having improved formability is provided. The rivet has a shank having a head at one end. The shank and the head have a refined grain structure. The rivet is manufactured from the region of the workpiece having a refined grain structure by first forming a region having a refined grain structure in a workpiece and then forming the rivet. The refined grain structure results in improved mechanical properties, such as formability, strength, toughness, ductility, corrosion resistance, and fatigue resistance. The improved formability of the rivet reduces the formation and propagation of cracks during the manufacture and installation of the rivets.

8 Claims, 9 Drawing Sheets

METHOD OF MANUFACTURING RIVETS HAVING HIGH STRENGTH AND FORMABILITY

This application is a divisional of Ser. No. 10/145,342 filed May 14, 2002.

FIELD OF THE INVENTION

The present invention relates to rivets and, more particularly, relates to a method of manufacturing rivets having high strength and formability.

BACKGROUND OF THE INVENTION

Structural assemblies are commonly formed by joining two or more structural members using fasteners, such as rivets. In the aerospace industry, where weight and strength are of critical concern, the joints of structural assemblies typically are subjected to repeated cycles of shear, compressive, and tensile stresses over the life of the assembly. As a result, the rivets must have good mechanical strength and fatigue resistance without adversely affecting the overall weight of the structural assemblies. In addition, because the structural assemblies may be exposed to the ambient environment, including moisture exposure and temperature fluctuations, the joints must be secured with rivets having good corrosion resistance and resistance to thermal stresses. To address the strength and weight requirements, conventional rivets are typically formed of materials having high strength-to-weight ratios, such as aluminum and aluminum alloys that have been hardened by cold working or precipitation hardening. Advantageously, a number of high strength aluminum alloys are available that are lightweight, and also have relatively high fatigue and corrosion resistance. Unfortunately, when in the hardened condition, high strength aluminum alloys tend to lack the formability that is necessary during manufacture and installation of the rivets, which can result in failure by necking, cracking or tearing.

In seeking to solve the problems associated with poor formability, modifications to the manufacturing process for forming the rivets have been proposed. One such modification includes forming the rivets from an aluminum alloy that is in a soft condition and, thereafter, heat treating the rivet, such as by precipitation hardening, to thereby harden the rivet prior to installation and use. The increase in formability of aluminum alloys in a soft condition reduces the likelihood that the rivet will fail as a result of necking, cracking, or tearing during manufacture. However, heat treating reduces the formability of the rivets which, as noted above, can result in failure during installation. Heat treating also adds an additional step during manufacture, which increases the manufacturing costs of the rivets and resulting structural assemblies.

Accordingly, there exists a need for an improved method for manufacturing rivets. The method should provide rivets having high formability to reduce the likelihood of necking, cracking, or tearing during the manufacture and installation of the rivets. The method also should be cost effective so as not to adversely affect the manufacturing cost of the rivets and the resulting structural assemblies. In addition, the rivets should be capable of being formed from materials that have high strength-to-weight ratios, and that exhibit high fatigue and corrosion resistance, as well as resistance to thermal stresses.

SUMMARY OF THE INVENTION

The present invention provides a method of manufacturing rivets. According to one embodiment of the present invention, the method includes providing a workpiece defining at least one region having a refined grain structure. In one embodiment, the providing step includes determining the dimensions of the rivet, selecting the workpiece based on the dimensions of the rivet, and then friction stir welding a portion of the workpiece to form the at least one region having a refined grain structure. In another embodiment, the providing step includes inserting a rotating friction stir welding probe into the workpiece to form the at least one region having a refined grain structure. The rotating friction stir welding probe can be moved through the workpiece along a predetermined path to form an elongate region having a refined grain structure. A blank is then removed from the at least one region of the workpiece having a refined grain structure. In one embodiment, the removing step includes punching the blank from the at least one region of the workpiece having a refined grain structure. The blank is then formed into a rivet. In one embodiment, the workpiece is machined prior to the forming step to remove at least one region of the workpiece having an unrefined grain structure. In another embodiment, the forming step includes extruding the blank through a die. In yet another embodiment, the forming step includes stamping the blank with a punch. In still another embodiment, the removing and forming steps are repeated.

According to another embodiment of the present invention, the method of manufacturing rivets includes providing a workpiece. At least one region having a refined grain structure is then formed in the workpiece. In one embodiment, the at least one region is formed by inserting a rotating friction stir welding probe into the workpiece. The rotating friction stir welding probe can be moved along a predetermined path to form an elongate region having a refined grain structure. Subsequent to the first forming step, a rivet is formed from the at least one region having a refined grain structure. In one embodiment, the second forming step includes removing a blank from the at least one region of the workpiece having a refined grain structure and forming the blank into a rivet. The removing step can include punching the blank from the at least one region of the workpiece having a refined grain structure. In another embodiment, the blank is formed into a rivet by extruding the blank through a die. In another embodiment, the blank is formed into a rivet by stamping the blank with a punch. In yet another embodiment, the method includes machining the workpiece prior to forming the rivet to remove at least one region of the workpiece having an unrefined grain structure. In another embodiment, the method includes repeating the second forming step.

The present invention also provides a rivet having improved formability. The rivet includes a shank that has a head at one end thereof. The shank and head substantially comprise a grain structure having a grain size less than about 5 microns. In one embodiment, the shank and head comprise aluminum, an aluminum alloy, titanium, or a titanium alloy. In another embodiment, the end of the shank opposite the head is adapted to be upset to form a second head.

The present invention also provides a structural assembly including a first structural member and a second structural member positioned adjacent to the first structural member to thereby define an interface therebetween. The structural assembly includes at least one rivet at least partially joining the first and second structural members along the interface. The rivet substantially comprises a refined grain structure having a grain size less than about 5 microns. The first structural member and the second structural member can comprise the same or dissimilar materials. In one embodiment, the first and second structural members comprise aluminum, an aluminum alloy, titanium, or a titanium alloy. In another embodiment, the rivets comprise aluminum, an aluminum alloy, titanium, or a titanium alloy. In yet another embodiment, the structural assembly includes an elongate weld joint at least partially joining the first and second structural members along the interface. In one embodiment, the elongate weld joint at least partially consumes at least one of the at least one rivets. In another embodiment, the elongate weld joint is an arc weld joint, resistance weld joint, gas weld joint, or friction stir weld joint.

Accordingly, there has been provided a rivet having improved formability, and an associated method of manufacturing the same. The method of manufacturing allows for the cost effective manufacture of rivets for forming structural assemblies, including structural assemblies for aerospace applications. The rivets have improved formability to reduce necking, cracking, or tearing during the manufacture and installation of the rivets. In addition, the rivets are capable of being formed from materials that have high strength-to-weight ratios and that exhibit high fatigue and corrosion resistance, as well as resistance to thermal stresses.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and which are not necessarily drawn to scale, wherein.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
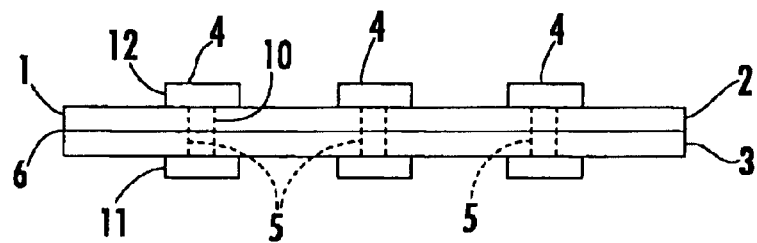
FIG. 1 is an elevation view illustrating a structural assembly that includes first and second structural members joined by rivets, according to one embodiment of the present invention.
Figure 2:
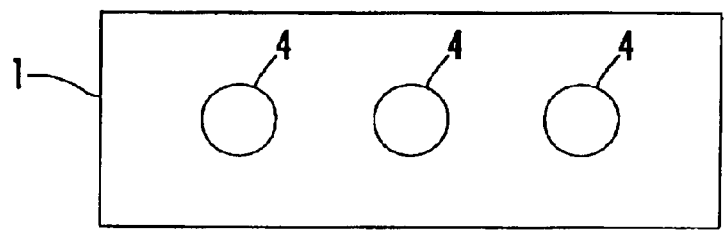
FIG. 2 is a plan view illustrating the structural assembly of FIG. 1.

Referring now to the drawings, and in particular to FIGS. 1 and 2, there is illustrated a structural assembly 1, according to one embodiment of the present invention. The structural assembly 1 includes a first structural member 2 and a second structural member 3 positioned adjacent the first structural member 2 so as to define an interface 6 therebetween. The structural assembly 1 includes one or more rivets 4 joining the first and second structural members 2, 3 together. The structural assembly 1 also defines apertures 5, which extend through the first and second structural members 2, 3 and are structured to receive a corresponding rivet 4. Although two structural members are illustrated, the number of structural members that can be joined together according to the present invention is not limited to two, but can include one structural member or three or more structural members. For example, according to one embodiment (not shown), the ends of a single structural member can be joined together.

Figure 13:
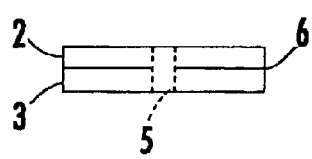
FIG. 13 is an elevation view illustrating a pair of structural members that are positioned for joining and that define an aperture for receiving a rivet, according to one embodiment of the present invention.

Each structural member 2, 3 can be machined, through known manufacturing means, from a single workpiece into a predetermined shape and thickness as required by the specific design loads and specifications of the resulting structural assembly 1. For example, a CNC milling machine can be used to machine each structural member 2, 3, as necessary. The structural members 2, 3 can be manufactured in a variety of configurations, including, for purposes of example only and not limitation, plates, blocks, tubular members, and curvilinear members. Similarly, the structural members 2, 3 can be formed of a variety of materials, as required by the specific design loads and specifications of the resulting structural assembly 1. The structural members 2, 3 preferably are formed of materials having high strength-to-weight ratios, including, for purposes of example only and not limitation, aluminum, aluminum alloys, titanium, titanium alloys, or steel alloys. As illustrated in FIG. 13, the structural members 2, 3 are pre-machined using known manufacturing methods, such as drilling or punching, to form apertures 5, each of which is structured to receive a corresponding rivet 4. The dimensions and configuration of each aperture 5 are based on the dimensions and configuration of the corresponding rivet 4.

Figure 3:
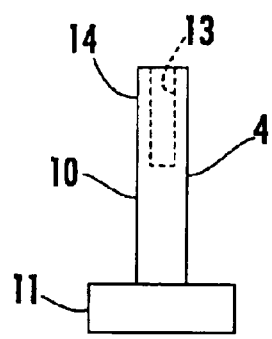
FIG. 3 is an elevation view illustrating a rivet, according to one embodiment of the present invention.
Figure 4:
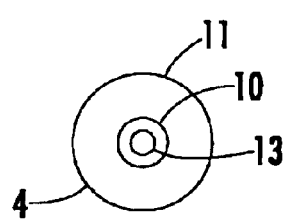
FIG. 4 is a plan view illustrating the rivet of FIG. 3.
Figure 5:
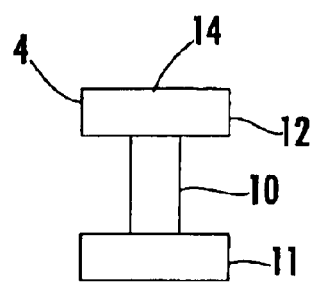
FIG. 5 is an elevation view illustrating a rivet after the end of the rivet has been upset, according to one embodiment the present invention.
Figure 14:
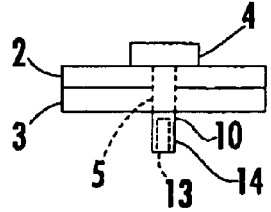
FIG. 14 is an elevation view illustrating a rivet inserted into the aperture defined by the structural members of FIG. 13, according to one embodiment of the present invention.
Figure 15:
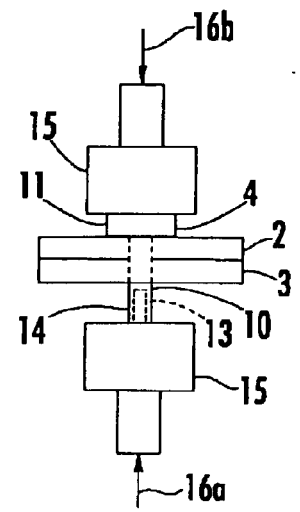
FIG. 15 is an elevation view illustrating the rivet of FIG. 14 positioned in a press, according to one embodiment of the present invention.
Figure 18:
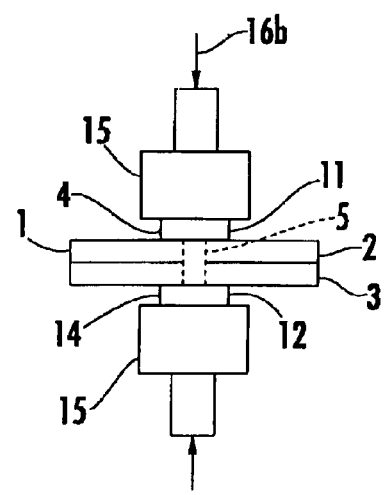
FIG. 18 is an elevation view illustrating a structural assembly formed by the joining of the structural members using the rivet of FIG. 17, according to one embodiment of the present invention.

Referring to FIGS. 3–5, each rivet 4 has a head 11 and a shank 10 extending therefrom. As illustrated in FIG. 14, the shank 10 of each rivet 4 is structured to extend through the corresponding apertures 5 defined by the first and second structural members 2, 3. The head 11 of the rivet 4 has a diameter that is larger than the aperture 5 of the first structural member 2 through which the shank 10 extends. The end 14 of the shank 10 opposite the head 11 is structured to be inserted through the corresponding apertures 5 defined by the first and second structural members 2, 3 and defines a cavity 13 structured to be upset to form a second head 12, as illustrated in FIGS. 5 and 18, to thereby at least partially join the first and second structural members together. The number of rivets 4 used to join the structural members will depend on the particular design loads and specifications of the structural assembly 1. For structural assemblies 1 having three or more structural members, each rivet 4 can join two or more structural members.

Figure 6:
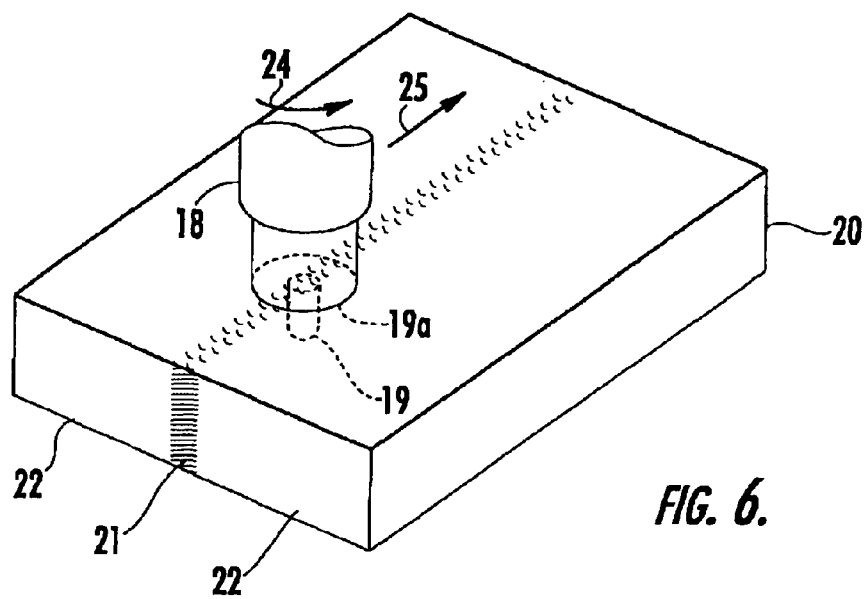
FIG. 6 is a perspective view illustrating a friction stir welding probe used to friction stir weld a workpiece to form a region having a refined grain structure, according to one embodiment of the present invention.

The rivets 4 are formed of a metal or metal alloy such that the rivets have a refined grain structure, and preferably a refined grain structure with a grain size of less than about 0.0002 inches (approximately 5 microns). More preferably, the rivets 4 are formed of a metal or metal alloy such that the rivets consist essentially of, according to one embodiment, or substantially comprise according to another embodiment, a refined grain structure with a grain size ranging in order of magnitude from approximately 0.0001 to approximately 0.0002 inches (approximately 3 to 5 microns) and having equiaxed shape. As illustrated in FIG. 6, the refined grain structure is formed by mixing or stirring at least a portion of a workpiece 20 with a non-consumable rotating friction stir welding probe 19. The workpiece 20 can be a stock piece of material, which is selected based on the number and dimensions of the rivets 4 that are to be formed from the workpiece 20 and based on the material property requirements of the rivets. The rivets 4, and thus, the workpiece 20, can be formed from a variety of materials, as required by the specific design loads, environmental conditions, and specifications of the resulting structural assembly 1.

To effect mixing of the workpiece 20, the workpiece is first secured to a worktable of a friction stir welding machine by means of a conventional clamp (not shown). The friction stir welding probe 19 is attached to a rotatable spindle 18 of the friction stir welding machine. The friction stir welding machine can include a device such as a drill or milling machine (not shown), that rotates the spindle 18 to thereby rotate the probe 19, for example in the direction indicated by arrow 24. The rotatable spindle 18 is preferably adapted to move the probe 19 parallel to the surface of the workpiece 20, for example in the direction indicated by arrow 25. As the friction stir welding probe 19 is forced through the outer surface of the workpiece 20, friction is generated between the probe 19 and the workpiece 20. An opening can be predrilled or tapped through the outer surface of the workpiece 20 to receive the rotating probe 19, but preferably the rotating probe 19 is thrust directly into the outer surface of the workpiece. The friction generates sufficient heat energy to plasticize the portions of the workpiece 20 proximate to the probe 19. More specifically, once inserted into the workpiece 20, the rotating probe 19 imparts mixing under the shoulder 19a of the probe 19 by shearing action parallel to the outer surface of the workpiece 20. The rotating probe 19 also imparts mixing around the threaded portion of the probe 19 parallel to the probe axis. See U.S. Pat. No. 5,460,317 to Thomas et al. for a general discussion of friction stir welding, the entire contents of which are incorporated herein by reference. The probe 19 can be moved randomly throughout the workpiece 20 or along a predetermined path that is chosen so as to friction stir weld or mix a certain region or regions 21 of the workpiece 20. Upon cooling, the region or regions 21 of the workpiece 20 that were mixed by the rotating probe 19 have a refined grain structure having improved strength, toughness, ductility, fatigue resistance, and corrosion resistance so that the material will resist the formation and propagation of cracks. Thus, there is formed in the workpiece 20 at least one region 21 of the workpiece 20 that has a refined grain structure.

As discussed above, the rotating probe 19 can be used to friction stir weld or mix a certain region or regions 21 of the workpiece 20, or, in another embodiment (not shown), the rotating probe 19 can be used to friction stir weld or mix all or substantially all of the workpiece 20. For example, the assignee of the present application has developed methods and apparatuses for refining the grain structure of a workpiece, as disclosed in commonly owned U.S. application Ser. No. 10/609,951 entitled "Method and Apparatus For Producing a Refined Grain Structure" filed concurrently herewith, the entire disclosure of which is hereby incorporated by reference.

Figure 7:
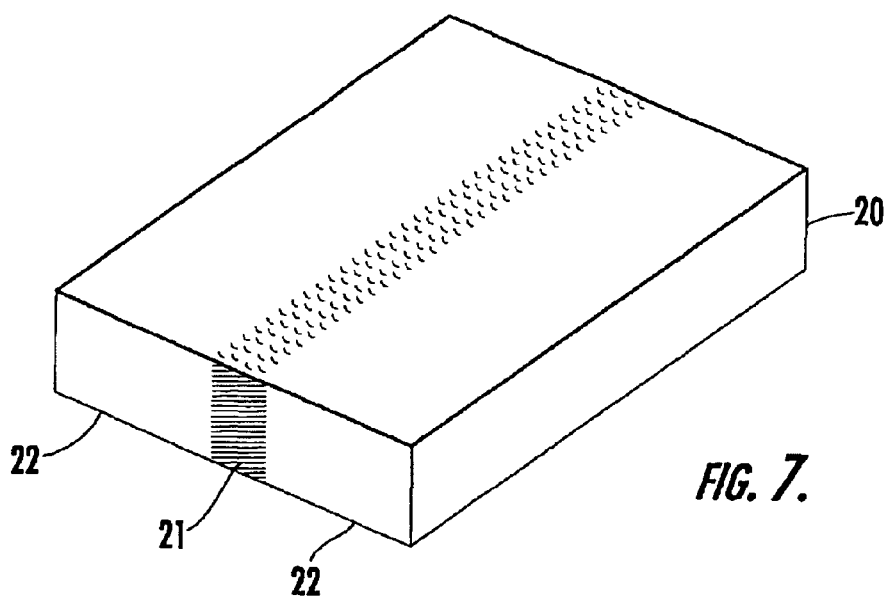
FIG. 7 is a perspective view illustrating a workpiece having a refined grain structure, according to one embodiment of the present invention.
Figure 8:
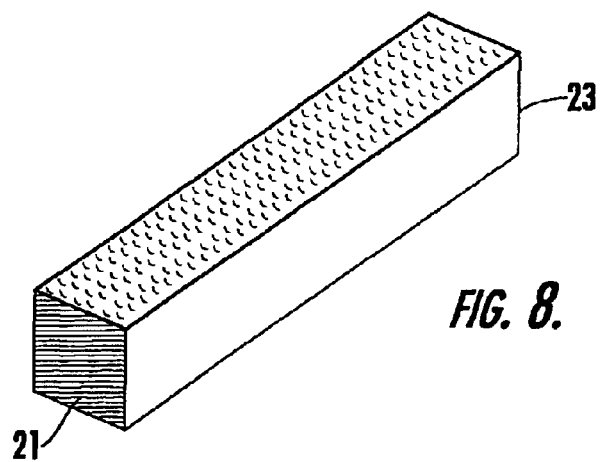
FIG. 8 is a perspective view illustrating a blank, at least a portion of which has a refined grain structure, according to one embodiment of the present invention.

As illustrated in FIGS. 7 and 8, the region or regions 22 of the workpiece 20 having an unrefined grain structure can be removed from the workpiece 20, for example by machining the workpiece 20, to thereby form a blank 23 substantially comprising the region or regions 21 of the workpiece 20 having a refined grain structure. The blank 23 also can be formed by punching the blank from the region or regions 21 of the workpiece 20 having a refined grain structure. The rivets 4 can be stamped, punched, extruded, or milled from the workpiece 20 or blank 23, as is known in the art. For example, the rivets 4 can be formed by extruding the blank 23 through a die or stamping the blank 23 with a punch. One blank 23 preferably is used to form a number of rivets 4 so that the rivets 4 can be manufactured cost effectively.

Figure 9:
FIG. 9 is a black and white photograph illustrating the grain structure of a rivet formed of AA 2017-T4 aluminum alloy at approximately 100 times magnification, as is known in the prior art.
Figure 10:
FIG. 10 is a black and white photograph illustrating the grain structure of a rivet formed of AA 2017-T4 aluminum alloy at approximately 500 times magnification, as is known in the prior art.
Figure 11:
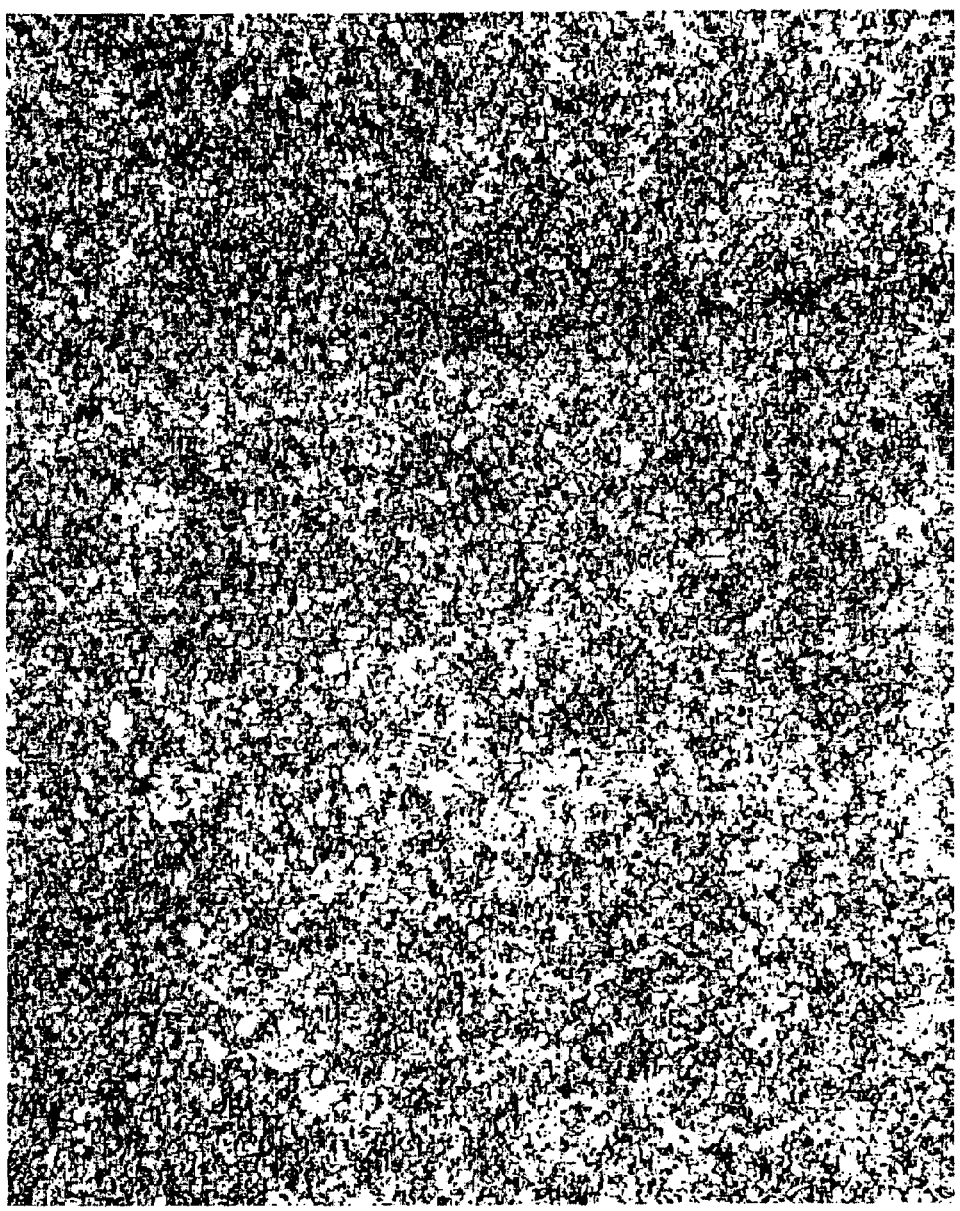
FIG. 11 is a black and white photograph illustrating the refined grain structure of a rivet formed of AA 2195-T6 aluminum alloy at approximately 100 times magnification, according to one embodiment of the present invention.
Figure 12:
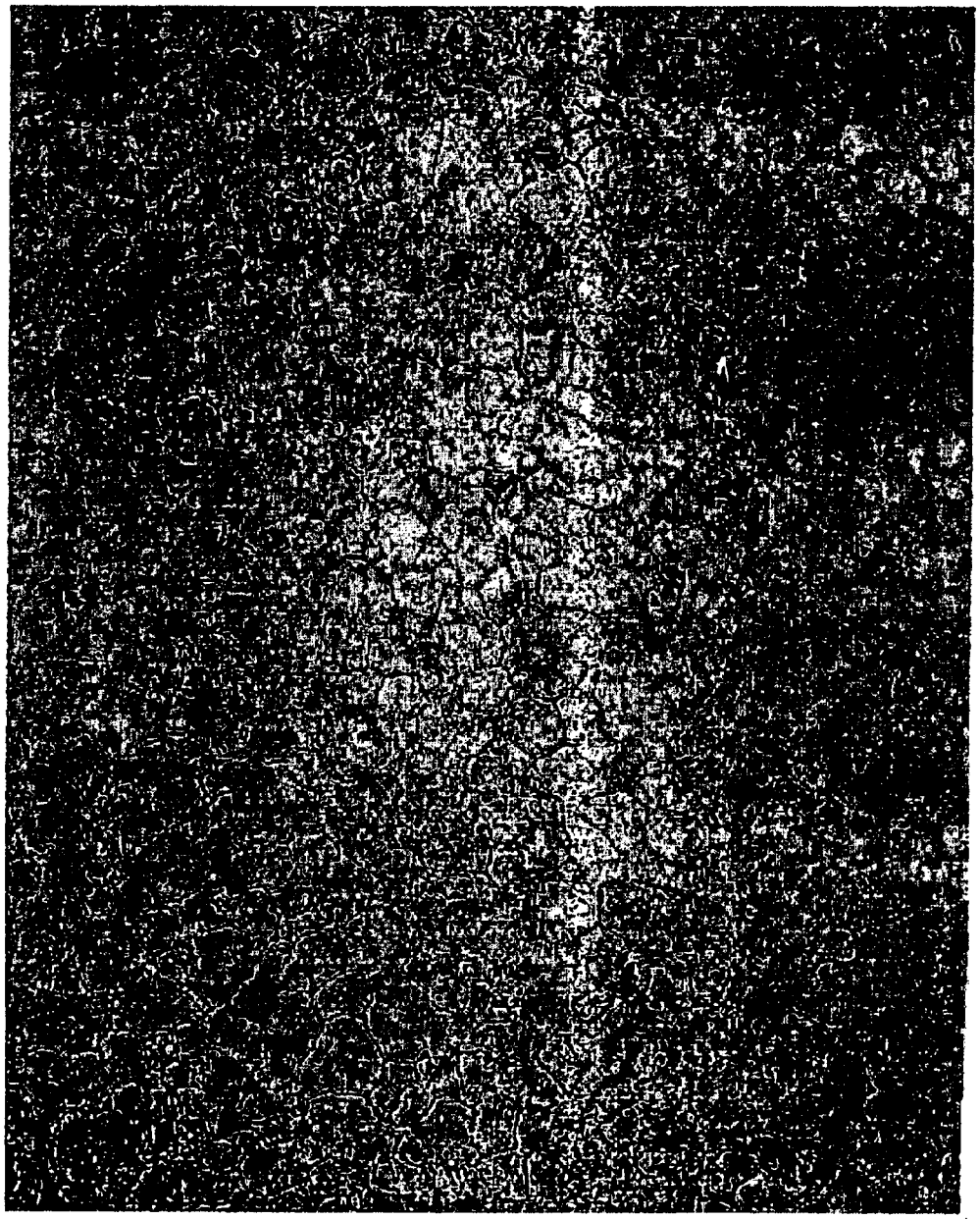
FIG. 12 is a black and white photograph illustrating the refined grain structure of a rivet formed of AA 2195-T6 aluminum alloy at approximately 500 times magnification, according to one embodiment of the present invention.

Referring to FIGS. 11 and 12, there is illustrated at 100 times and 500 times magnification, respectively, the refined grain structure of the rivets 4 formed according to the present invention from AA 2195-T6 aluminum alloy. In contrast, FIGS. 9 and 10 illustrate the grain structure of conventional rivets formed of AA 2017-T4 aluminum alloy at 100 times and 500 times magnification, respectively. Advantageously, the rivets 4 formed according to the present invention have a refined grain structure that resists the formation and propagation of cracks and, thus, have improved formability so as to resist necking, cracking, or tearing during manufacture and installation. While not intending to be bound by any particular theory, it is believed that the refined grain structure or fine-grain material from which the rivets 4 are formed according to the present invention is more formable than the unrefined grain structure or course grained material used to form conventional rivets, since the former has a greater total grain boundary area to impede dislocation motion. This is contrary to the conventional relationship between grain size and formability that results from cold working, i.e., cold working increases strength and refines grain size, but decreases formability.

Referring to FIGS. 13–18, the structural assembly 1 is constructed by positioning the first structural member 2 relative to the second structural member 3 such that the structural members 2, 3 define an interface 6 therebetween. An aperture or apertures 5, as illustrated in FIG. 13, are formed in the structural members 2, 3, for example by drilling. The apertures 5 can be formed before or after positioning the structural members 2, 3 relative to one another. The number of apertures 5 formed in the structural members 2, 3 depends on the number of rivets 4 that will be used to join the structural members 2, 3. As illustrated in FIG. 14, the shank 10 of each rivet 4 is inserted into and through the corresponding apertures 5 defined by the first and second structural members 2, 3 so that the end 14 of the shank 10 defining the cavity 13 extends from the aperture of the second structural member 3.

Figure 16:
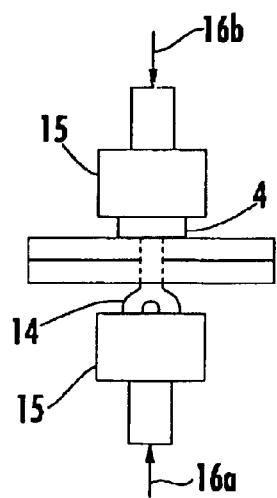
FIG. 16 is an elevation view illustrating the end of the rivet of FIG. 15 partially upset by the press, according to one embodiment of the present invention.
Figure 17:
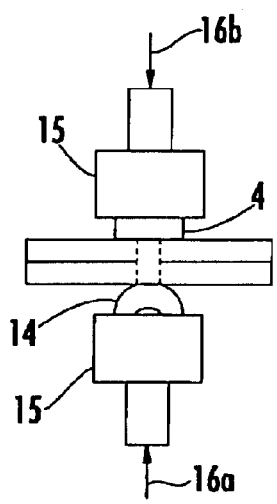
FIG. 17 is an elevation view illustrating the end of the rivet of FIG. 16 further upset by the press, according to one embodiment of the present invention.

The end 14 of the shank 10 defining the cavity 13 is deformed in a process known as "upsetting." In one method of upsetting, the end 14 of the shank 10 is deformed by applying a compressive force to the shank 10. For example, as illustrated by the arrows 16a, b in FIGS. 15–18, a press 15 can be used to apply a compressive force to the end 14 of the shank 10 and the head 11 of the rivet 4. As shown in FIGS. 16 and 17, the forces applied by the press 15 compress and deform or "upset" the end 14 of the shank 10 and the cavity 13 defined therein. The deformation of the end 14 of the shank 10 causes the end 14 to increase in diameter and form a second head 12, as illustrated in FIG. 18. The diameter of the second head 12, is larger than the diameter of the corresponding aperture 5 of the second structural member 3 so that the rivet 4 joins the first and second structural members 2, 3, thus forming the structural assembly 1. In other embodiments (not shown), other methods and devices may be used for upsetting the end 14 of the shank 10 of the rivet 4. For example, the rivets 4 can be installed using a conventional rivet gun (not shown).

Figure 19:
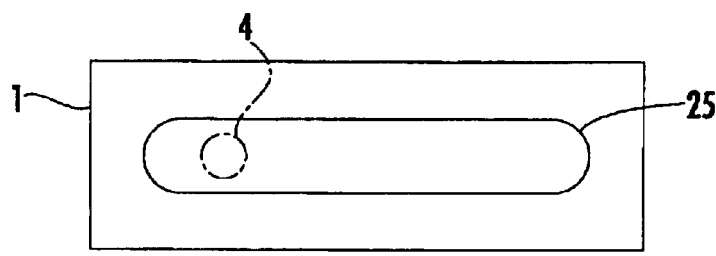
FIG. 19 is a plan view illustrating a structural assembly joined by an elongate weld joint that at least partially consumes at least one of the rivets, according to one embodiment of the present invention.

In addition to the other advantages discussed above, the rivets 4 of the present invention also are compatible with other known methods of joining structural members 2, 3. For example, as shown in FIG. 19, an elongate weld joint 25 can be formed to at least partially join the structural members 2, 3 to form the structural assembly 1. The weld joint 25 can be formed by various methods, including arc welding, resistance welding, gas welding, and friction welding. As shown in FIG. 19, the elongate weld joint 25 can consume one or more of the rivets 4.

Where the elongate weld joint 25 comprises a friction stir weld joint, the structural members 2, 3 can be formed of either similar or dissimilar metals. Advantageously, since the structural members 2, 3 are joined by friction stir welding and rivets 4, the structural members 2, 3 can be formed of dissimilar metals that would be unweldable or uneconomical to join by conventional fusion welding techniques. Unweldable materials, when joined by conventional fusion welding techniques, produce relatively weak weld joints that tend to crack during weld solidification. Such materials include aluminum and some aluminum alloys, particularly AA series 2000 and 7000 alloys. The use of friction stir welding and rivets 4 permits the structural members 2, 3 formed of unweldable materials to be securely joined. Friction stir welding and rivets 4 also can be used to securely join weldable materials to other weldable and to unweldable materials. For example, one or both of the structural members 2, 3 can be formed of aluminum, aluminum alloys, titanium, or titanium alloys. Thus, according to this embodiment of the present invention, the materials that form the structural members 2, 3 can be chosen from a wider variety of light weight, high strength metals and alloys, thereby facilitating reduction of the overall weight of the resulting structural assembly 1, which is a critical concern in the aerospace industry.

Figure 20:
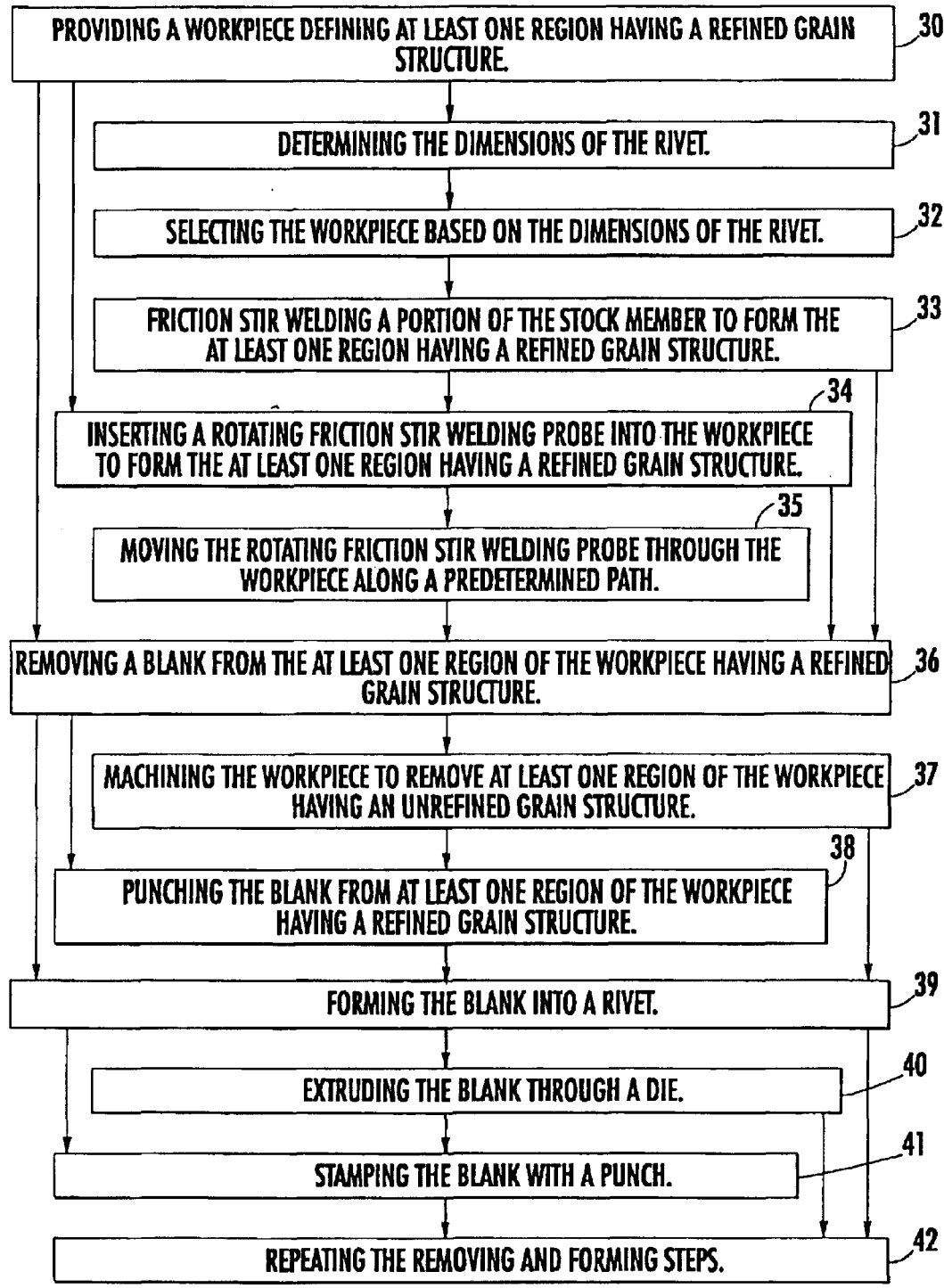
FIG. 20 is a flow chart illustrating the steps for manufacturing rivets, according to one embodiment of the present invention.

Referring now to FIG. 20, there is illustrated the operations performed to manufacture rivets, according to one embodiment of the present invention. The method includes providing a workpiece defining at least one region having a refined grain structure. See block 30. In one embodiment, the providing step includes determining the dimensions of the rivet, selecting a workpiece based on the dimensions of the rivet, and friction stir welding a portion of the workpiece to form the at least one region having a refined grain structure. See blocks 31, 32, and 33. In another embodiment, the providing step includes inserting a rotating friction stir welding probe into the workpiece to form the at least one region having a refined grain structure. See block 34. The rotating friction stir welding probe can be moved through the workpiece along a predetermined path. See block 35. The method includes removing a blank from the at least one region of the workpiece having a refined grain structure. See block 36. In one embodiment, the workpiece is machined to remove at least one region of the workpiece having an unrefined grain structure. See block 37. In another embodiment, the blank is punched from at least one region of the workpiece having a refined grain structure. See block 38. The blank is then formed into a rivet. See block 39. In one embodiment, the forming step includes extruding the blank through a die. See block 40. In another embodiment, the forming step includes stamping the blank with a punch. See block 41. In still another embodiment, the removing and forming steps are repeated to form additional rivets. See block 42.

Figure 21:
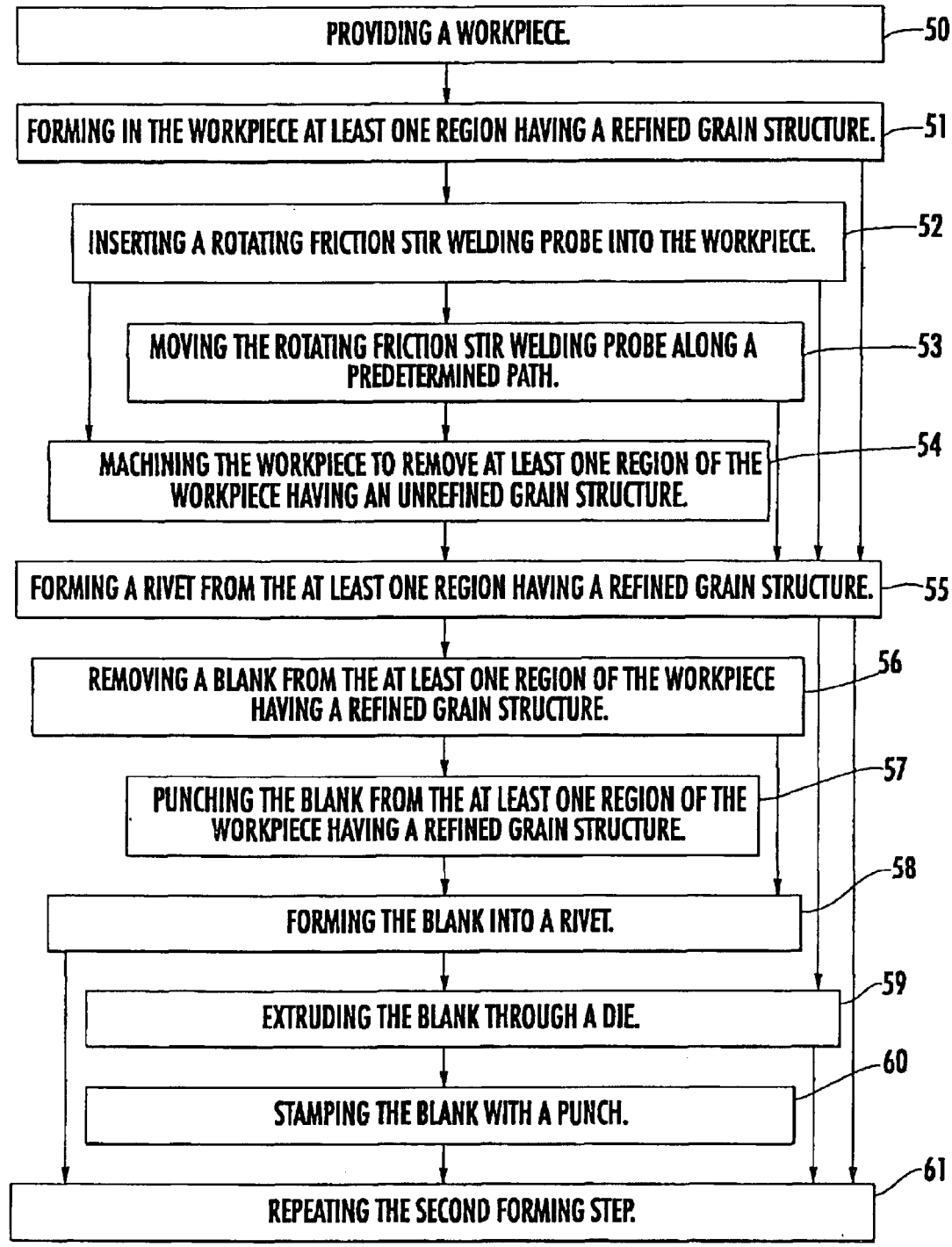
FIG. 21 is a flow chart illustrating the steps for manufacturing rivets, according to another embodiment of the present invention.

Referring now to FIG. 21, there is illustrated the operations performed to manufacture rivets, according to another embodiment of the present invention. The method includes providing a workpiece. See block 50. At least one region having a refined grain structure is formed in the workpiece. See block 51. In one embodiment, the forming step includes inserting a rotating friction stir welding probe into the workpiece. See block 52. The method may also include moving the rotating friction stir welding probe along a predetermined path. See block 53. In another embodiment, the workpiece is machined to remove at least one region of the workpiece having an unrefined grain structure. See block 54. A rivet is formed from the at least one region having a refined grain structure. See block 55. In one embodiment, the step of forming the rivet includes removing a blank from the at least one region of the workpiece having a refined grain structure. See block 56. The removing step may comprise punching the blank from the at least one region of the workpiece having a refined grain structure. See block 57. The blank is then formed into a rivet. See block 58. In one embodiment, the rivet is formed by extruding the blank through a die. See block 59. In another embodiment, the rivet is formed by stamping the blank with punch. See block 60. The forming of the rivet can then be repeated to form additional rivets. See block 61.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A structural assembly, comprising:
    a first structural member;
    a second structural member positioned adjacent to said first structural member to thereby define an interface therebetween; and
    at least one rivet at least partially joining said first and second structural members along said interface and wherein said at least one rivet substantially comprises a refined grain structure having a grain size less than about 5 microns.

2. A structural assembly according to claim 1 wherein said first structural member and said second structural member comprise dissimilar materials.

3. A structural assembly according to claim 1 wherein said first and second structural members comprise the same material.

4. A structural assembly according to claim 1 wherein said at least one rivet comprises a material selected from the group consisting of aluminum, an aluminum alloy, titanium, and a titanium alloy.

5. A structural assembly according to claim 1 wherein at least one of said first and second structural members comprises a material selected from the group consisting of aluminum, an aluminum alloy, titanium, and a titanium alloy.

6. A structural assembly according to claim 1 further comprising an elongate weld joint joining said first and second structural members at least partially along said interface.

7. A structural assembly according to claim 6 wherein said elongate weld joint at least partially consumes at least one of said at least one rivets.

8. A structural assembly according to claim 6 wherein said elongate weld joint comprises a weld joint selected from the group consisting of an arc weld joint, resistance weld joint, gas weld joint, and friction stir weld joint.

* * * * *